(12) United States Patent
Lee et al.

(10) Patent No.: US 8,412,007 B2
(45) Date of Patent: Apr. 2, 2013

(54) 3-D WAVEGUIDE COUPLING DEVICE CAPABLE OF TWO-STEP COUPLING AND MANUFACTURE METHOD THEREOF

(75) Inventors: Ming-Chang Lee, Hsinchu (TW);
Yao-Tsu Yang, Hsinchu (TW);
Chun-Wei Liao, Hsinchu (TW);
Sheng-Wen Huang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 393 days.

(21) Appl. No.: 12/788,300

(22) Filed: May 27, 2010

(65) Prior Publication Data
US 2011/0255824 A1    Oct. 20, 2011

(30) Foreign Application Priority Data
Apr. 19, 2010   (TW) ............................... 99112143 A

(51) Int. Cl.
*G02B 6/12*   (2006.01)
*G02B 6/10*   (2006.01)
*G02B 6/34*   (2006.01)

(52) U.S. Cl. ............... 385/14; 385/37; 385/43; 385/50; 385/131; 385/132

(58) Field of Classification Search ............... 385/37, 385/129–132, 14, 39, 43, 50
See application file for complete search history.

(56) References Cited

U.S. PATENT DOCUMENTS 7,526,166 B2 *   4/2009   Bookbinder et al. ......... 385/125
8,064,745 B2 *   11/2011  Fortusini et al. ............. 385/37

* cited by examiner

*Primary Examiner* — Uyen-Chau N Le
*Assistant Examiner* — Michael Mooney

(57) ABSTRACT

The present invention relates to a 3-D waveguide coupling device capable of two-step coupling and a manufacture method thereof, the 3-D waveguide coupling device comprises: a first substrate, at least one waveguide layer, at least one assisting grating, at least one coupling material layer, and at least one 3-D tapered structure layer, wherein 3-D waveguide coupling device is able to couple the light into the waveguide layer by way of two-step coupling through the 3-D tapered structure layer, the coupling material layer and the assisting grating. Moreover, the light can also be coupled out from the waveguide layer through the assisting grating, the coupling layer, and the 3-D tapered structure. The manufacture method is adapted to fabricate the 3-D waveguide coupling device capable of two-step coupling via the present semiconductor process technology without increasing any other new equipment.

3 Claims, 32 Drawing Sheets

5

3-D WAVEGUIDE COUPLING DEVICE CAPABLE OF TWO-STEP COUPLING AND MANUFACTURE METHOD THEREOF

CROSS-REFERENCE TO RELATED APPLICATION

This application claims foreign priority from a Taiwan Patent Application, Ser. No. 099112143, filed on Apr. 19, 2010.

BACKGROUND OF THE INVENTION

1. Technical Field

The present invention relates to a waveguide coupler, and more particularly, to a 3-D waveguide coupling device capable of two-step coupling, which has at least one 3-D tapered structure layer, at least one coupling material layer and at least one assisting grating, so that light is able to be coupled into a waveguide layer through the 3-D tapered structure layer, the coupling material layer and the assisting grating by way of two-step coupling.

2. Description of Related Art

Optical devices can be divided into active devices and passive devices, the active device indicates that the optical device capable of generation or amplification of light, or absorption of light into electronic signals; and the passive device represents that the optical device showing the ability of optical signal processing in time or frequency domains.

A coupler is a passive optical device used for optical power transfer between two optical media, for example: between two waveguide couplers or between a fiber and a waveguide coupler. With the development of the semiconductor manufacturing technology, an integrated coupler is able to be fabricated by way of thin film deposition, photolithography and etching processes. Moreover, a grating structure can be formed on a waveguide layer, so as to assist power transfer between the optical medium and the waveguide coupler with the aid of phase matching induced by the grating. Such a grating coupler is able to increase the efficiency of light coupling by adjusting the arrangement period of the grating.

However, when using the abovementioned grating-assisting waveguide coupler to transform the light energy from one optical medium to another, for example, a fiber to a waveguide coupler, the effective energy transformation is critical and limited by the alignment angle between the waveguide coupler and fiber. An easy way is to put the fiber and waveguide coupler in parallel and to take advantage of evanescent coupling. However, due to the size difference between these two elements, the coupling efficiency is very low, in additions, the height of the waveguide coupler is constrained by the semiconductor thin film process and can not be fabricated to be very high, so as to cause the difficulty for optical connection between the waveguide coupler and the fiber through the grating structure.

In view of the drawbacks and shortcomings of conventional grating couplers, inventors do researches hardly and expect to improve the disadvantages of the grating couplers described above. A grating-assisting three dimension waveguide couple device and a method for manufacturing thereof were disclosed in a R.O.C patent with patent application number 98,136,872, referring to FIGS. 1A and 1B, which illustrate a stereo view and a cross-section view of the grating-assisting three dimension waveguide couple device, respectively, where the grating-assisting three dimension waveguide couple device 1a includes: a first substrate 11a, which is a silicon-on-insulator (SOI) substrate with a semiconductor 111a and a insulator 112a; a waveguide layer 12a formed on the first substrate 11a and as a propagation layer of the light; an assisting grating 4a formed on the waveguide layer 12a and capable of help to lead the light into the waveguide layer 12a by way of phase match; and a plurality of 3-D tapered structure layer 19a formed on the waveguide layer 12a and cover the assisting grating 4a, moreover, there is a height differential being existed between the two sides of the 3-D tapered structure layer 19a, so as to make a two-dimension transverse variation of the 3-D tapered structure layer 19a; So that, the two-dimension transverse variation the utility of the assisting grating 4a produce the coincidence of the propagation constants of the 3-D tapered structure layer 19a and the waveguide layer 12a, so as to increase the coupling efficiency of both things, then the light can be efficiently transferred into the waveguide layer 12a from the 3-D tapered structure layer 19a when the light is propagated in the 3-D tapered structure layer 19a, therefore, the energy coupling efficiency of light between two optical media is increased.

Concerning the practicable application of the grating-assist three dimension waveguide couple device 1a, the refractive index of the 3-D tapered structure layer 19a may be very different from refractive index of the waveguide layer 12a. Although the two-dimension transverse variation the utility of the assisting grating 4a produce the coincidence of the propagation constants of the 3-D tapered structure layer 19a and the waveguide layer 12a so as to increase the coupling efficiency of both things, a considerable degree of scattering loss is produced when the light pass through the assisting grating 4a. So that the coupling efficiency of the grating-assist three dimension waveguide couple device 1a is still need to be improved.

Accordingly, in view of the drawbacks and shortcomings of the grating-assisting waveguide and the grating-assist three dimension waveguide couple device, the inventor of the present application has made great efforts to make inventive research thereon and eventually provided a 3-D waveguide coupling device capable of two-step coupling and a manufacture method thereof according to the present invention.

SUMMARY OF THE INVENTION

The primary objective of the present invention is to provide a 3-D waveguide coupling device capable of two-step coupling, where at least one coupling material layer is added between a 3-D tapered structure layer and a waveguide layer, so that, the light can be coupled into the waveguide layer through at least two-step coupling, then the efficiency of light coupling is increased.

The another objective of the present invention is to provide a manufacture method for the 3-D waveguide coupling device capable of two-step coupling, where through the manufacture method, the 3-D waveguide coupling device is fabricated by using the present semiconductor processes without increasing any new equipment.

Accordingly, to achieve the abovementioned objective, the inventor proposes a 3-D waveguide coupling device capable of two-step coupling, which comprises:

a first substrate; at least one waveguide layer formed on the first substrate and being as a propagation layer of light; at least one assisting grating formed on the waveguide layer and capable of helping to lead the light into the waveguide layer; at least one coupling material layer formed on the waveguide layer by way of covering the assisting grating; at least one 3-D tapered structure layer formed on the coupling material layer and has a height differential between the two sides thereof, so as to make a two-dimension transverse variation of the 3-D tapered structure layer, the two-dimension transverse variation produces the coincidence of the propagation constants of the 3-D tapered structure layer and the coupling material layer, and then the light can be coupled into the coupling material layer from the 3-D tapered structure layer directly and efficiently when the light initially propagates in the 3-D tapered structure layer, and furthermore, the light is coupled into the waveguide layer from the coupling material layer through an assisting grating structure; wherein the refractive index of the waveguide layer can be higher than the refractive indices of the coupling material layer and the 3-D tapered structure layer.

Moreover, to achieve the objective as above mentioned, the inventor proposes a manufacture method for 3-D waveguide coupling device capable of two-step coupling, the manufacture method comprises:
(1) fabricating a first substrate; (2) forming a waveguide layer on the first substrate; (3) manufacturing at least one assisting grating on the waveguide layer by using a first mask; (4) making the waveguide layer as at least one bar-type waveguide layer through a second mask; (5) forming a silicon dioxide (SiO2) layer on the bar-type waveguide layers as a second coupling material layer; (6) forming a silicon oxinitride (SiON) layer on the SiO2 layer to be the first coupling material; (7) making the SiON layer as at least one bar-type SiON layer via a third mask; (8) coating a first polymeric substance onto the SiON layer; (9) fabricating a mold for making a 3-D tapered structure layer; (10) pressing the first polymeric substance by using the mold; (11) standing the mold for a span; (12) removing the mold from the bar-type SiON layers; (13) the 3-D tapered structure layer is formed on the bar-type SiON layers; and (14) making the 3-D tapered structure layer as at least one wedge-type 3-D structure layer by using a fifth mask.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

To more clearly describe a 3-D waveguide coupling device capable of two-step coupling and a manufacture method thereof according to the present invention, an embodiment of the present invention will be described in detail with reference to the attached drawings hereinafter.

Figure 1A:
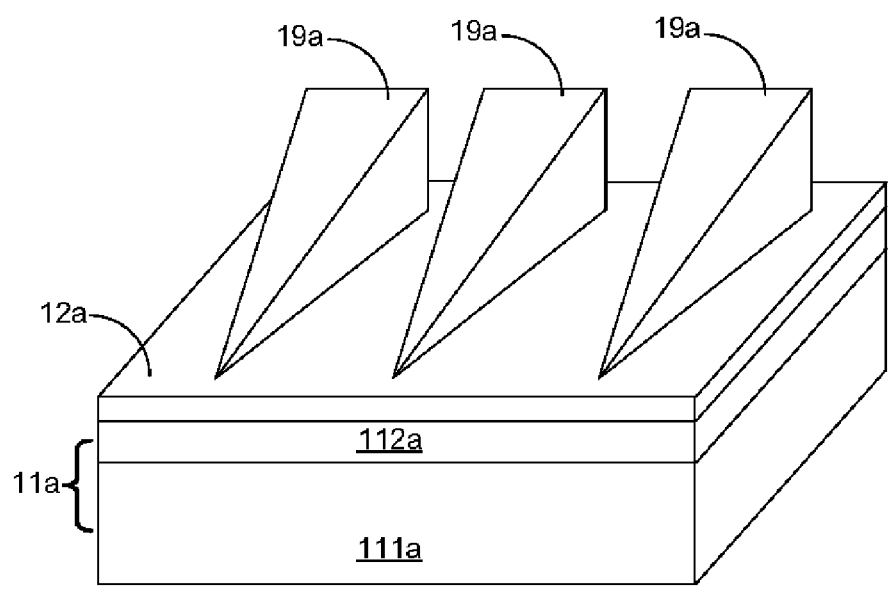
FIG. 1A is a stereo view of a grating-assisting three dimension waveguide couple device.
Figure 1B:
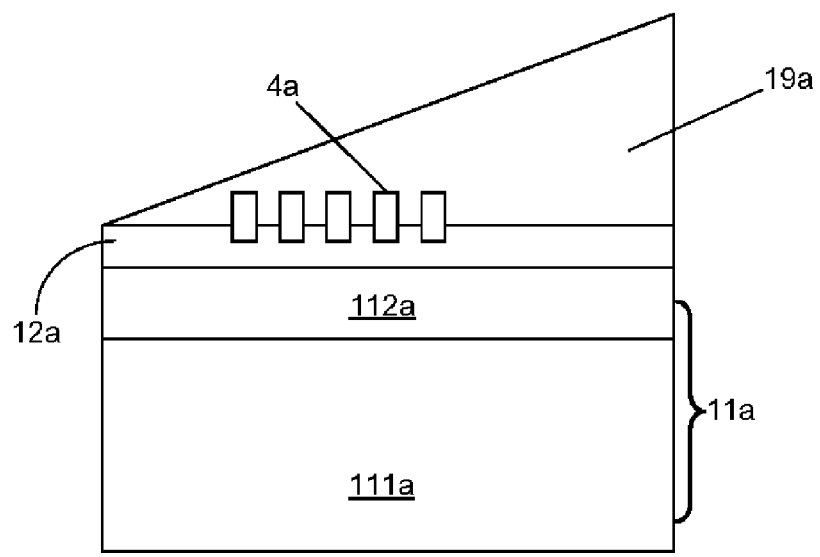
FIG. 1B is a cross-section view of the grating-assisting three dimension waveguide couple device.
Figure 2:
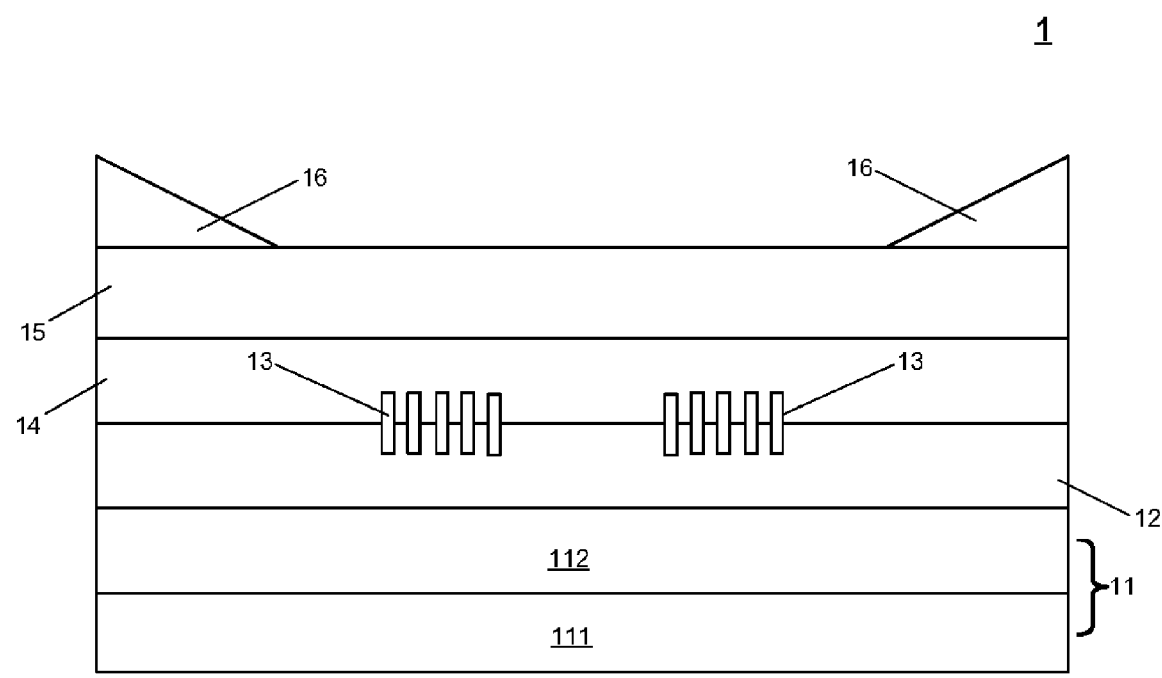
FIG. 2 is the side view of a 3-D waveguide coupling device capable of two-step coupling according to the present invention.

Referring to FIG. 2, which illustrates a side view of the 3-D waveguide coupling device capable of two-step coupling according to the present invention, as shown in FIG. 2, the 3-D waveguide coupling device capable of two-step coupling 1 is a 2-D beam spot size converting device, which includes: a first substrate 11, a waveguide layer 12, two assisting gratings 13, a second coupling material, a first coupling material, and two 3-D tapered structure layers 16. Wherein the materials for making as the first substrate 11 are listed as follows: a silicon-on-insulator substrate, a silicon oxinitride (SiON)-on-insulator substrate, a silicon nitride (SiN)-on-insulator substrate, and a semiconductor substrate; In the embodiment of the present invention, the SOI substrate is taken as the first substrate 11, as shown in FIG. 2, the first substrate 11 is made of a silicon substrate (Si) 111 and a silicon dioxide (SiO2) 112 by way of stacking.

Continuously referring to FIG. 2, the waveguide layer 12 is formed on the first substrate 11 and as a propagation layer of light, generally speaking, the materials for fabricating as the waveguide layer 12 are listed as follows: a silicon (Si), a silicon nitride (SiN), a silicon oxinitride (SiON), and a silicon carbide (SiC); In the embodiment of the present invention, the Si is chosen to be made as the waveguide layer 12 formed on the SiO2 layer 112 so as to facilitate the waveguide layer 12 bear the effect of SOI. The two assisting gratings 13 are oppositely formed on the waveguide layer 12 and capable of help to lead the light into the waveguide layer 12 at either end. The second coupling material is formed on the waveguide layer 12 by way of covering the assisting gratings 13, wherein the materials for making as the coupling material are follows: the SiO2, the SiON and a stack of the SiO2 and the SiON; In the embodiment of the present invention, as shown in FIG. 2, the a SiO2 layer 14 is made as the second coupling material, and a SiON layer 15 is formed as the first coupling layer.

Referring to FIG. 2 again, the abovementioned 3-D tapered structure layer 16 is a photographic material of code SU-8, wherein the 3-D tapered structure layer 16 is formed on the first coupling material and has a height differential between the two sides thereof, so as to make a two-dimension transverse variation of the 3-D tapered structure layer 16, wherein the height differential and the two-dimension transverse variation produces the coincidence of the propagation constants of the 3-D tapered structure layer 16 and the first coupling material layer, so that the light is able to be coupled into the first coupling material layer from the 3-D tapered structure layer 16 efficiently and directly when the light initially propagates in the 3-D tapered structure layer 16, then the light is further coupled into the waveguide layer 12 from the first coupling material layer through the second coupling material and the assisting gratings 13. In the embodiment of the present invention, the SiON layer 15 and the SiO2 layer 14 are made as the first coupling material and the second coupling material, respectively. Wherein the refractive index of the photographic material of code SU-8 is smaller than the refractive index of the SiON layer 15, the refractive index of the SiON layer 15 is larger than the refractive index of the SiO2 layer 14, and the refractive index of the SiO2 layer 14 is smaller than the refractive index of the waveguide layer 12; So that, the 3-D tapered structure layer 16 can couple the light into the SiON layer 15, and the light is further coupled into the waveguide layer 12 from the SiON layer 15 through the assisting gratings 13 and the SiO2 layer 14, then the two-step coupling of the light is finished.

Figure 3:
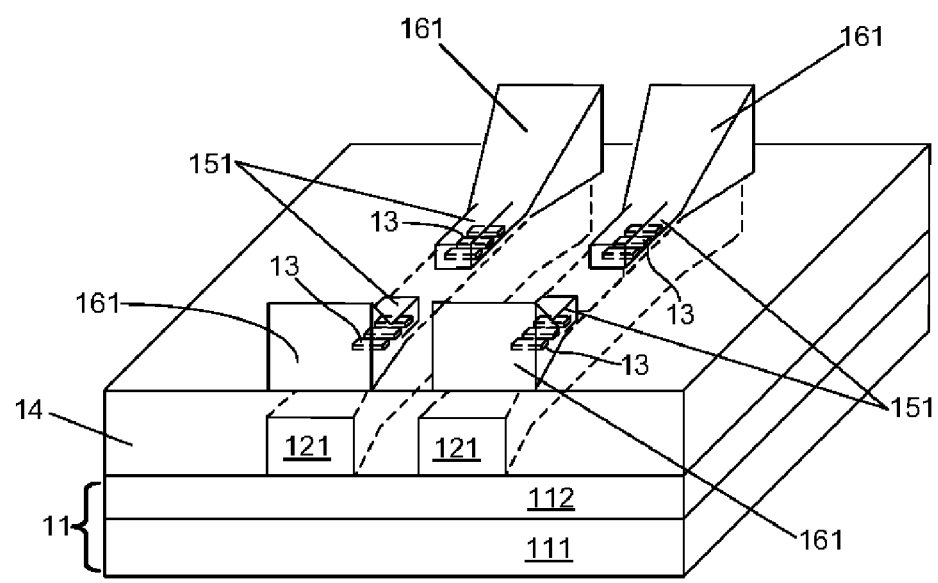
FIG. 3 is the stereo view of the 3-D waveguide coupling device capable of two-step coupling.

The abovementioned 3-D waveguide coupling device capable of two-step coupling 1 is disclosed through the side view thereof, however, the side view merely shows the framework concept of the 3-D waveguide coupling device capable of two-step coupling 1 according to the present invention. The practicable application needs to be concerned when fabricating the 3-D waveguide coupling device capable of two-step coupling 1. FIG. 3 illustrates a stereo view of the 3-D waveguide coupling device capable of two-step coupling. As shown in FIG. 3, the 3-D waveguide coupling device capable of two-step coupling 1 presents the feature of the 2-D beam spot size converting device, the entity of the 3-D waveguide coupling device capable of two-step coupling 1 includes: the first substrate 11; the waveguide layer 12 made as two bar-type waveguide layers 121; two pairs of the assisting gratings 13 formed on the two bar-type waveguide layers 121, respectively; the SiO2 layer 14 is formed on the bar-type waveguide layers 121 by way of covering the two pairs of the assisting gratings 13; the SiON layer 15 is fabricated to four bar-type SiON layers 151 and disposed on the second coupling material, besides, the formed position of the bar-type SiON layers 151 is correspondent to the bar-type waveguide layers 121 formed below the second coupling material, so that, there are two bar-type SiON layers 151 being formed over each of bar-type waveguide layers 121 and as the first coupling materials; the 3-D tapered structure layers 16 are fabricated to four wedge-type 3-D structure layers 161, which are formed on the SiO2 layer 14 by pair, moreover, the formed position of the wedge-type 3-D structure layers 161 is correspondent to the bar-type waveguide layers 121 formed below the SiO2 layer 14, furthermore, the wedge-type 3-D structure layers 161 cover part of the bar-type SiON layers 151.

Figure 4A:
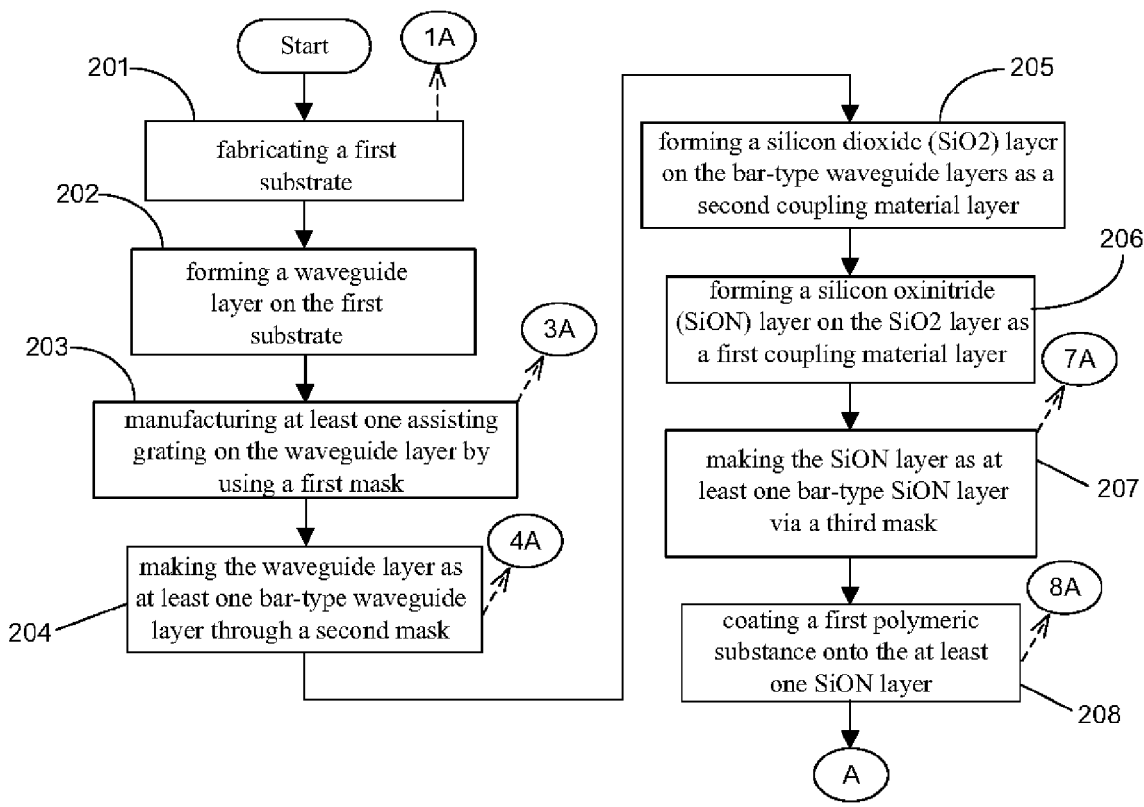
FIGS. 4A and 4B are flow charts of a manufacture method for the 3-D waveguide coupling device capable of two-step coupling according to the present invention.
Figure 4B:
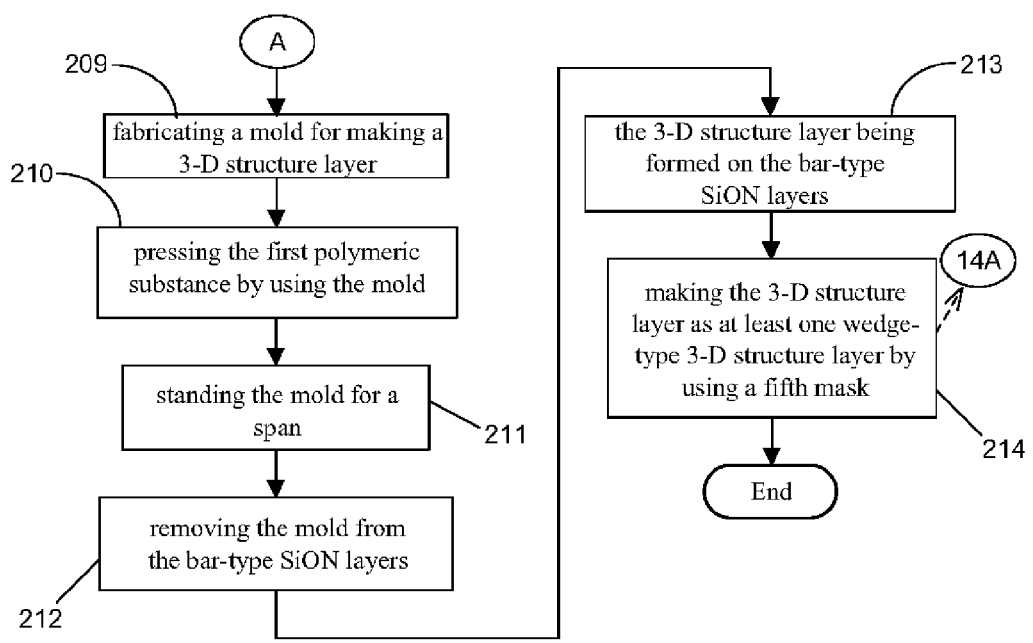
Figure 5:
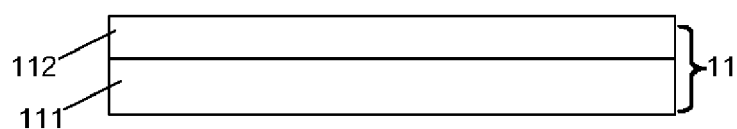
FIG. 5 is the cross-section view of a first substrate within the 3-D waveguide coupling device capable of two-step coupling.
Figure 6:
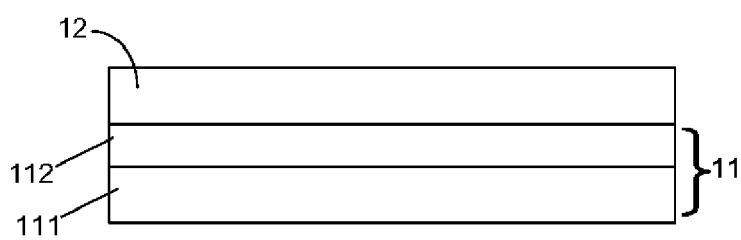
FIG. 6 is the cross-section view of the first substrate and a waveguide layer within the 3-D waveguide coupling device capable of two-step coupling
Figure 7:
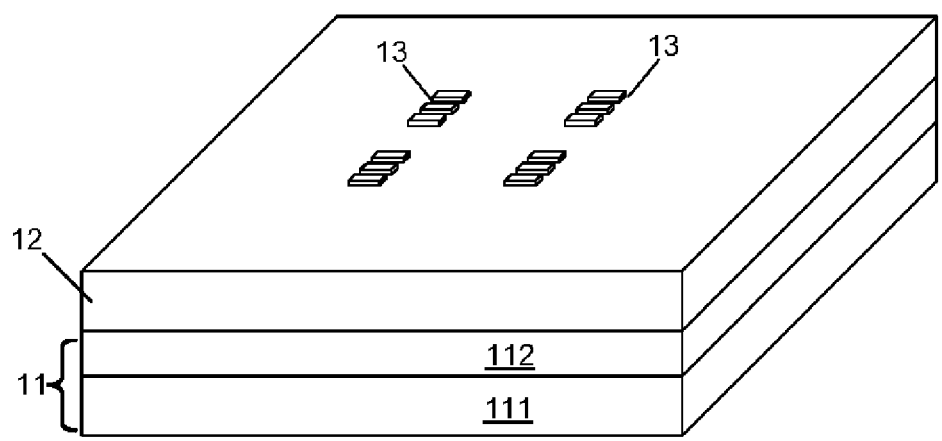
FIG. 7 is the stereo view of the first substrate, the waveguide layer and assisting gratings of the 3-D waveguide coupling device capable of two-step coupling.

The framework concept and the entity of the 3-D waveguide coupling device capable of two-step coupling 1 according to the present invention are described above through the cross-section view and stereo view thereof, respectively, after that, the manufacture method for the 3-D waveguide coupling device capable of two-step coupling 1 is disclosed in following description. Referring to FIGS. 4A and 4B, which illustrate flow charts of the manufacture method for the 3-D waveguide coupling device capable of two-step coupling according to the present invention, the manufacture method includes the steps of:

Firstly, executing step (201), fabricating the first substrate 11, please referring to FIG. 5, which illustrate the cross-section view of the first substrate within the 3-D waveguide coupling device capable of two-step coupling, as shown in FIG. 5, the first substrate 11 is made by stacking the Si substrate 111 and the SiO2 substrate 112; Next to step (202), forming the waveguide layer 12 on the first substrate 11, referring to FIG. 6, which illustrates the cross-section view of the first substrate and the waveguide layer within the 3-D waveguide coupling device capable of two-step coupling, as shown in FIG. 6, waveguide layer 12 is formed on the first substrate 11 by way of using a furnace or wafer-bonding; Then next to step (203), manufacturing at least one assisting grating 13 on the waveguide layer 12 by using a first mask 2, referring to FIG. 7, which illustrates the stereo view of the first substrate, the waveguide layer and the assisting grating of the 3-D waveguide coupling device capable of two-step coupling, as shown in FIG. 7, two pairs of assisting gratings 13 are formed on the waveguide layer 12 after photolithography and etching.

Figure 8:
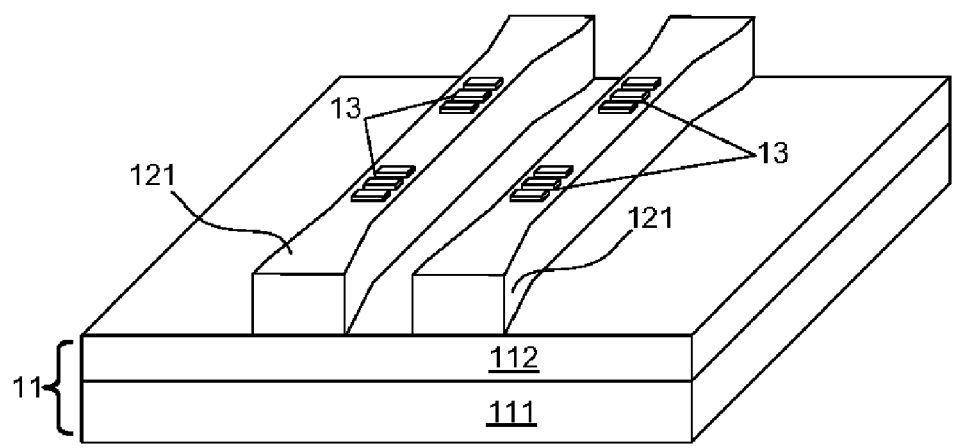
FIG. 8 is a second stereo view of the first substrate, the waveguide layer and the assisting grating of the 3-D waveguide coupling device capable of two-step coupling.
Figure 9:
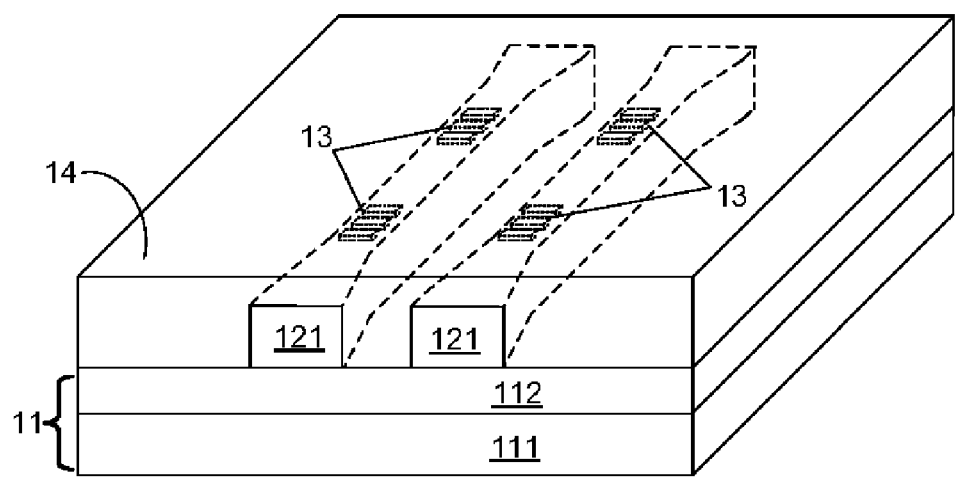
FIG. 9 is the stereo view of the first substrate, the waveguide layer, the assisting grating, and a silicon dioxide (SiO2) layer of the 3-D waveguide coupling device capable of two-step coupling.

After completing the step (203), then next to step (204), making the waveguide layer 12 as at least one bar-type waveguide layer 121 through a second mask 3, referring to FIG. 8, which illustrates a second stereo view of the first substrate, the waveguide layer and the assisting grating of the 3-D waveguide coupling device capable of two-step coupling, as shown in FIG. 8, the waveguide layer 12 is fabricated to two bar-type waveguide layer 121 after executing the photolithography and etching of the waveguide layer 12 via the second mask 3, the two bar-type waveguide layer 121 are disposed on the SiO2 layer 112 parallel to each other; Next to step (205), forming the SiO2 layer 14 on the two bar-type waveguide layer 121 to be the second coupling material, referring to FIG. 9, which illustrates the stereo view of the first substrate, the waveguide layer, the assisting grating, and the SiO2 layer of the 3-D waveguide coupling device capable of two-step coupling, as shown in FIG. 9, the SiO2 layer 14 with a plane surface is formed on the bay-type waveguide layers 121 by way of spin-on glass (SOG), the SiO2 layer 14 also covers the bay-type waveguide layers 121 and the assisting gratings 13.

Figure 10:
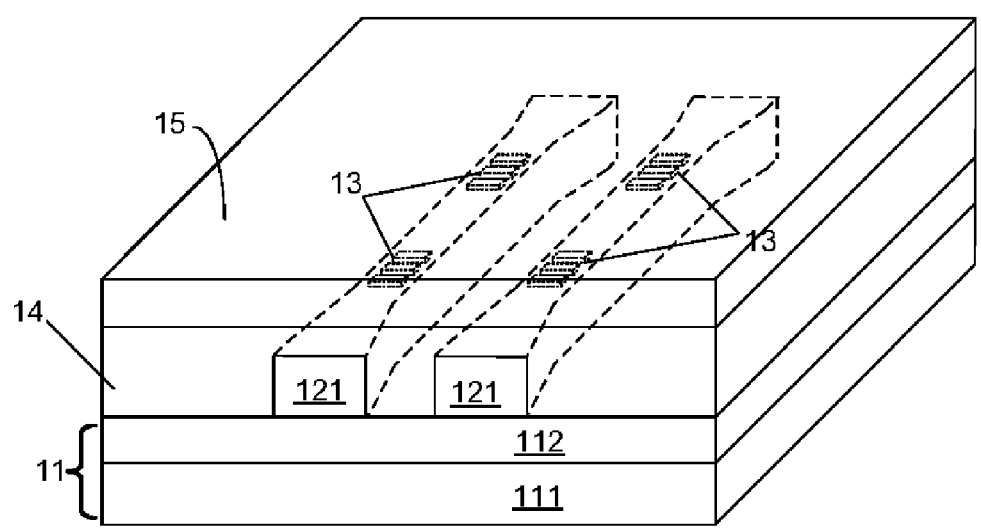
FIG. 10 is the stereo view of the first substrate, the waveguide layer, the assisting grating, the SiO2 layer, and a silicon oxinitride (SiON) layer of the 3-D waveguide coupling device capable of two-step coupling.
Figure 11:
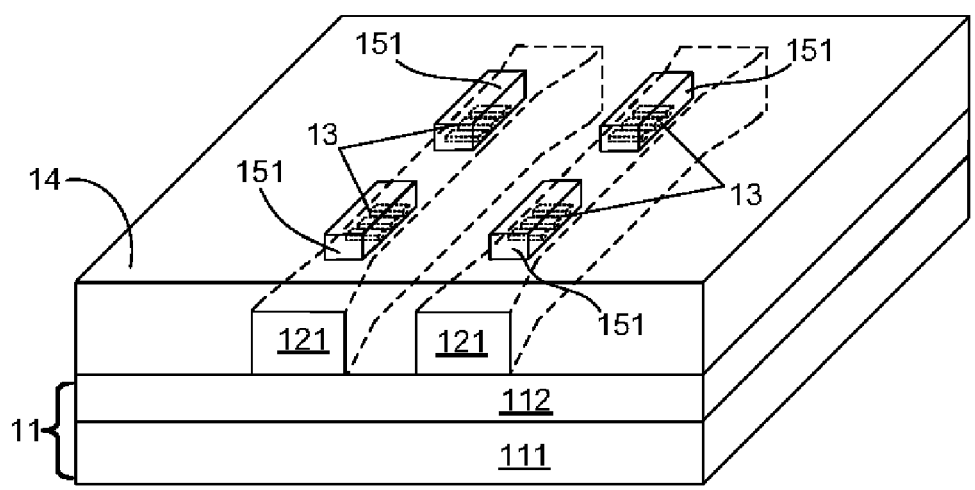
FIG. 11 is the second stereo view of the first substrate, the waveguide layer, the assisting grating, the SiO2 layer, and the SiON layer of the 3-D waveguide coupling device capable of two-step coupling.

After finishing the step (205), then next to step (206), forming the SiON layer 15 on the SiO2 layer 14 to be the first coupling material, please referring to FIG. 10, which illustrates the stereo view of the first substrate, the waveguide layer, the assisting grating, the SiO2 layer, and the SiON layer of the 3-D waveguide coupling device capable of two-step coupling, as shown in FIG. 10, in the embodiment of the present invention, the SiON layer 15 is formed on the SiO2 layer 14 by way of Plasma Enhanced Chemical Vapor Deposition (PECVD); Next to step (207), making the SiON layer 15 as at least one bar-type SiON layer 151 via a third mask 4 (the graph of the third mask 4 is plot in FIG. 24), referring to FIG. 11, which illustrates the second stereo view of the first substrate, the waveguide layer, the assisting grating, the SiO2 layer, and the SiON layer of the 3-D waveguide coupling device capable of two-step coupling, as shown in FIG. 11, the bar-type SiON layers 151 are formed on the second coupling material by pair, the formed position of the bar-type SiON layers 151 is correspondent to the bar-type waveguide layers 121 formed below the second coupling material, so that, there are two bar-type SiON layers 151 being formed over each of bar-type waveguide layers 121 and as the first coupling materials.

Figure 12:
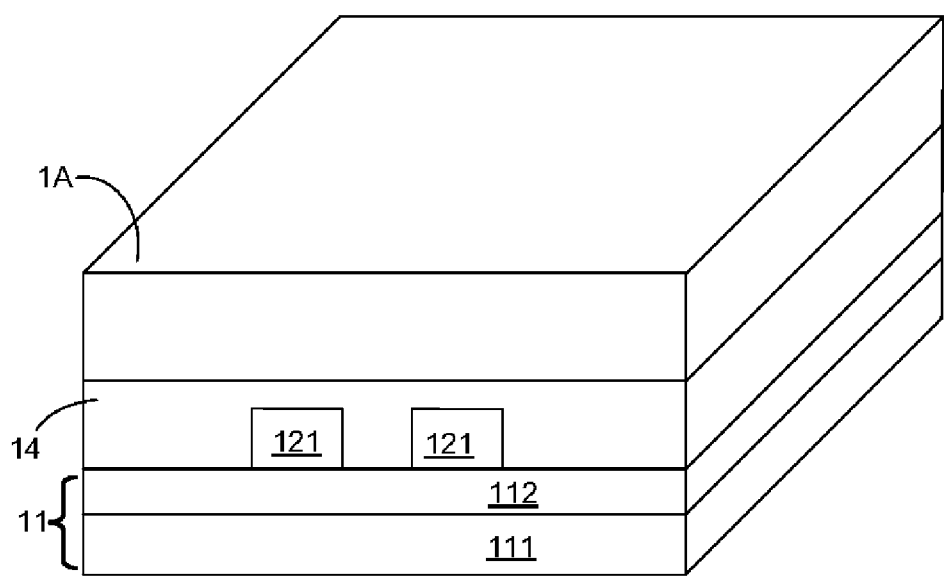
FIG. 12 is the stereo view of the first substrate, the waveguide layer, the assisting grating, the SiO2 layer, the SiON layer, and a first polymeric substance of the 3-D waveguide coupling device capable of two-step coupling.

Next to step (208), coating a first polymeric substance 1A onto the bar-type SiON layers 151, please referring to FIG. 12, which illustrates the stereo view of the first substrate, the waveguide layer, the assisting grating, the SiO2 layer, the SiON layer, and the first polymeric substance of the 3-D waveguide coupling device capable of two-step coupling, as shown in FIG. 12, the first polymeric substance 1A is a photographic material of code SU-8 which is over and covers the bar-type SiON layers 151.

Figure 13:
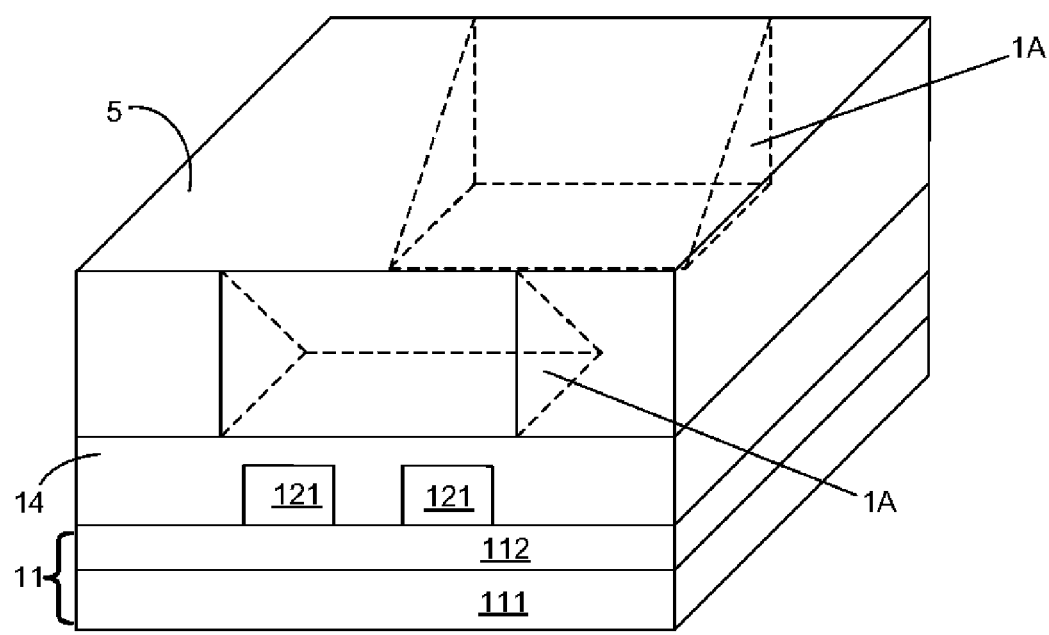
FIG. 13 is the stereo view of the first substrate, the waveguide layer, the assisting grating, the SiO2 layer, the SiON layer, the first polymeric substance, and a mold for making a 3-D structure layer of the 3-D waveguide coupling device capable of two-step coupling.
Figure 14:
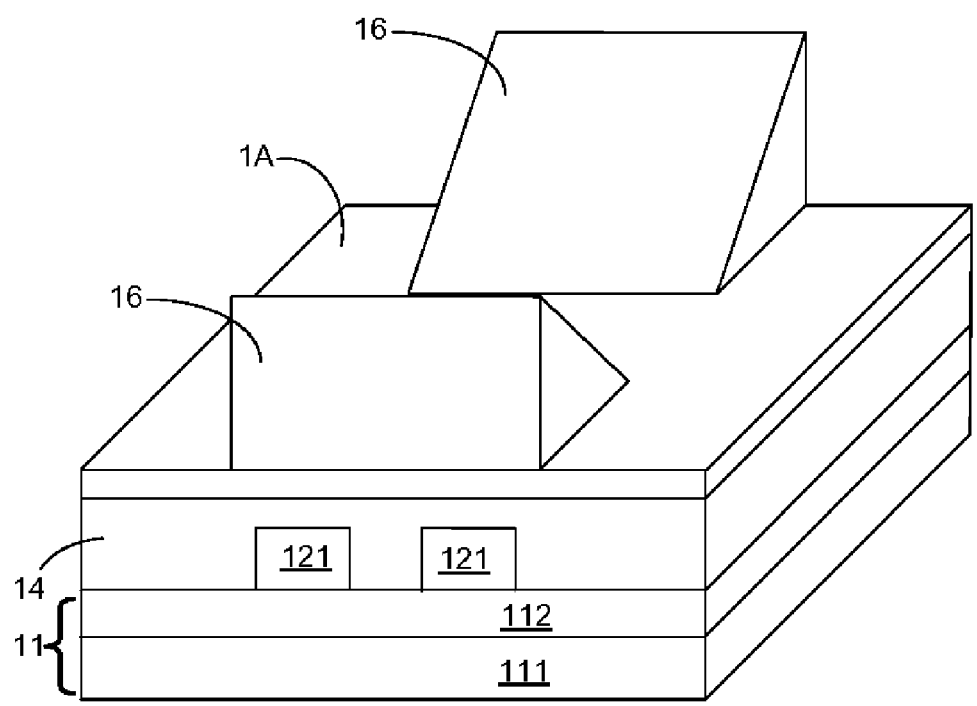
FIG. 14 is the stereo view of the first substrate, the waveguide layer, the assisting grating, the SiO2 layer, the SiON layer, the first polymeric substance, and the 3-D structure layer of the 3-D waveguide coupling device capable of two-step coupling.

The first polymeric substance 1A is coated on the bar-type SiON layers 151 in abovementioned manufacturing steps, wherein the first polymeric substance 1A is used to make at least one 3-D tapered structure layer 16; However, it need a specific mold for making the 3-D tapered structure layer 16, so that, step (209) is executed, fabricating a mold 5 for making the 3-D tapered structure layer 16; Then next to step (210) pressing the first polymeric substance 1A by using the mold 5 for making the 3-D tapered structure layer 16, please referring to FIG. 13, which illustrates the stereo view of the first substrate, the waveguide layer, the assisting grating, the SiO2 layer, the SiON layer, the first polymeric substance, and the mold for making a 3-D tapered structure layer of the 3-D waveguide coupling device capable of two-step coupling, as shown in FIG. 13, the first polymeric substance is filled into two grooves of the mold 5; Next to step (211), standing the mold 5 for a span; Then next to step (212), removing the mold 5 from the bar-type SiON layers 151; Next to step (213), the at least one 3-D tapered structure layer 16 is formed on the bar-type SiON layers 151, please referring to FIG. 14, which illustrates the stereo view of the first substrate, the waveguide layer, the assisting grating, the SiO2 layer, the SiON layer, the first polymeric substance, and the 3-D tapered structure layer of the 3-D waveguide coupling device capable of two-step coupling, as shown in FIG. 14, the two opposed 3-D tapered structure layer 16 are formed on the bar-type SiON layers 151. Finally, executing step (214), making the 3-D tapered structure layer 16 as at least one wedge-type 3-D structure layer 161 by using a fifth mask 7, as shown in FIG. 3, the 3-D tapered structure layers 16 are fabricated to four wedge-type 3-D structure layers 161, which are formed on the SiO2 layer 14 by pair, moreover, the formed position of the wedge-type 3-D structure layers 161 is correspondent to the bar-type waveguide layers 121 formed below the SiO2 layer 14, furthermore, the wedge-type 3-D structure layers 161 cover part of the bar-type SiON layers 151.

Figure 15:
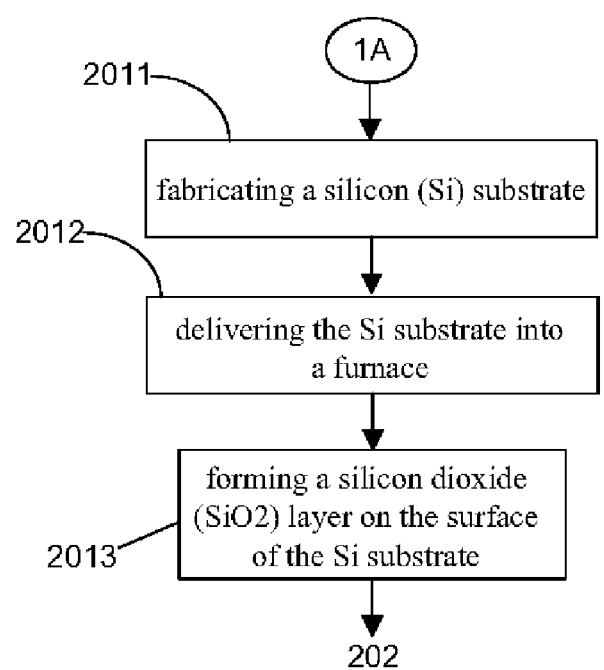
FIG. 15 is the flow chart of the detailed step of the step (201)

Furthermore, FIG. 15 illustrates the flow chart of the detailed step of the step (201). In the manufacture method for the 3-D waveguide coupling device capable of two-step coupling as above mentioned, the step (201) further includes two detailed steps: firstly, executing step (2011), fabricating the Si substrate 111; Next to step (2012), delivering the Si substrate 111 into the furnace; Then Next to step (2013), forming the SiO2 layer 112 on the surface of the Si substrate 111.

Figure 16:
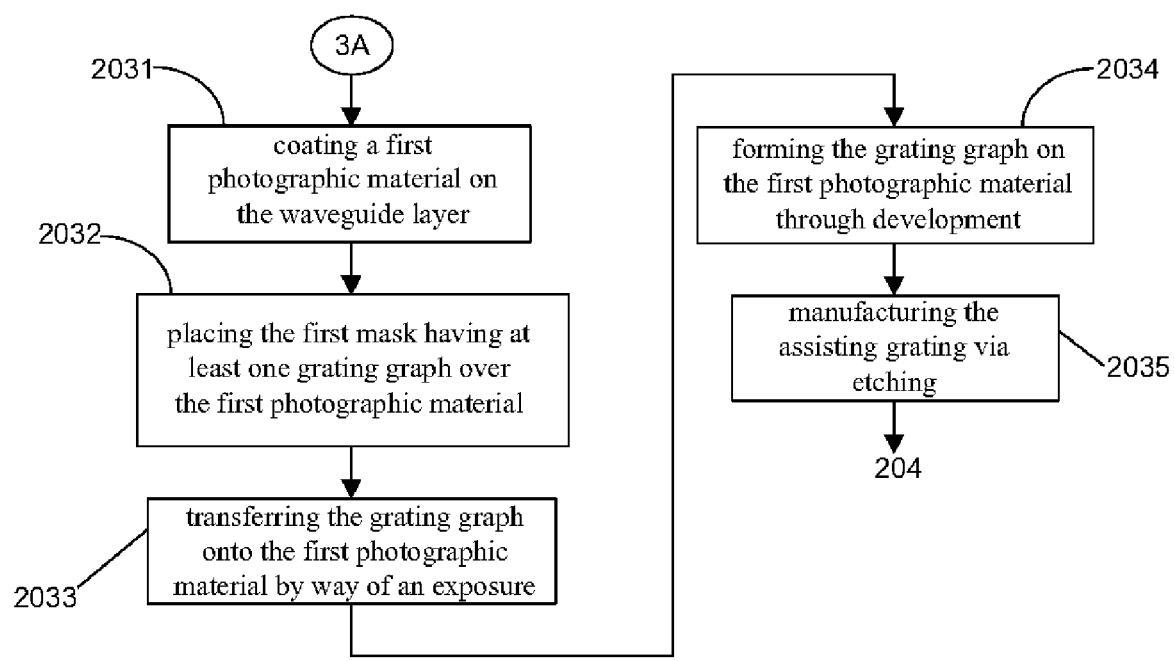
FIG. 16 is the flow chart of the detailed step of the step (203)
Figure 17:
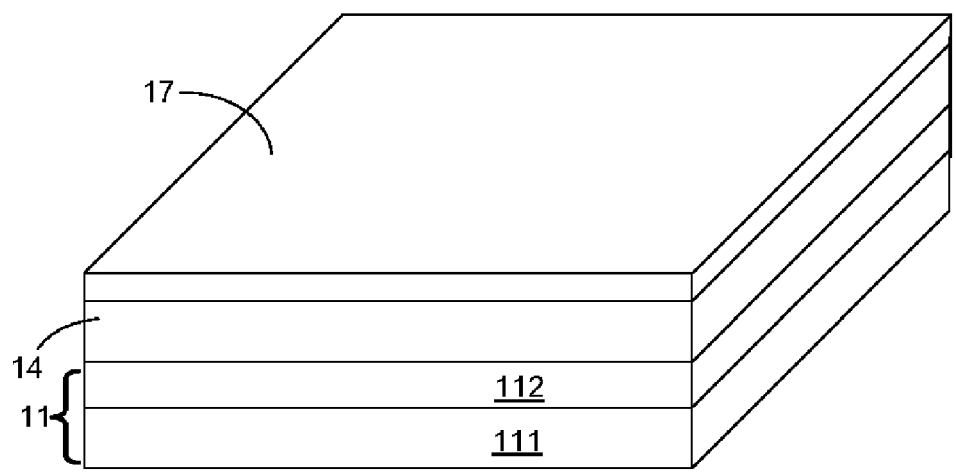
FIG. 17 is the stereo view of the first substrate, the waveguide layer and a first photographic material of the 3-D waveguide coupling device capable of two-step coupling.
Figure 18:
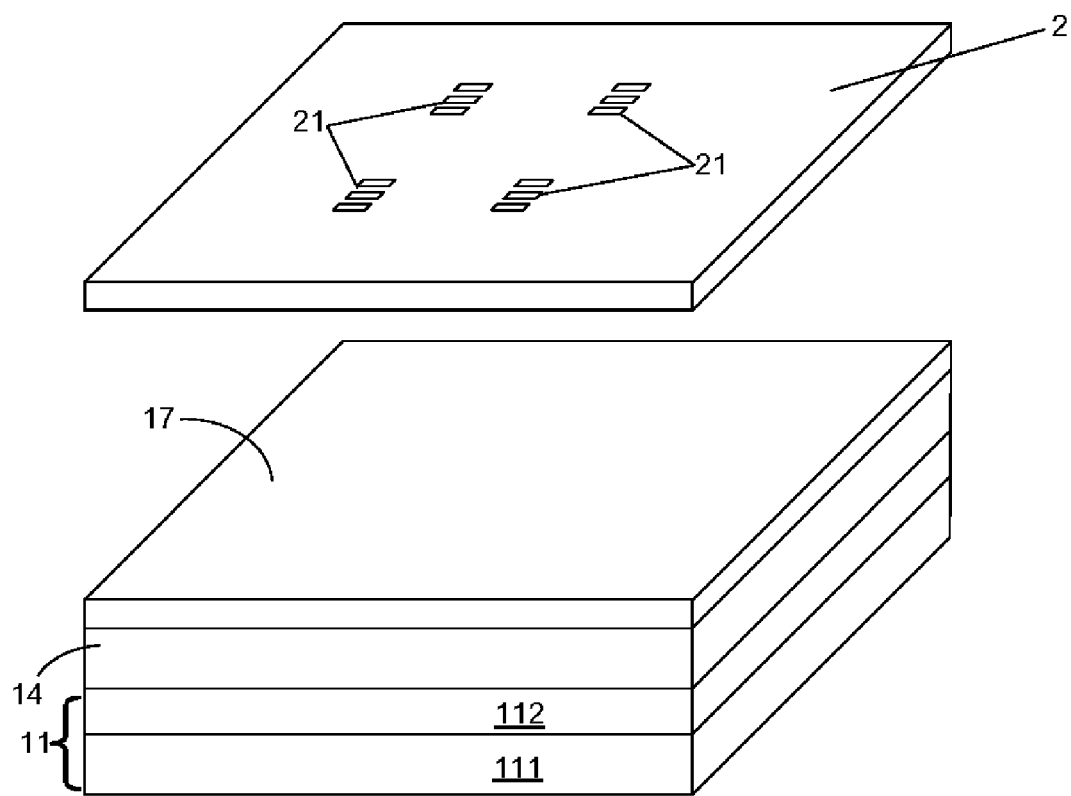
FIG. 18 is the stereo view of the first substrate, the waveguide layer, the first photographic material, and a first mask of the 3-D waveguide coupling device capable of two-step coupling.

Moreover, please referring to FIG. 16, which illustrates the flow chart of the detailed step of the step (203), in the manufacture method for the 3-D waveguide coupling device capable of two-step coupling, the step (203) further includes the steps of:

Firstly, executing step (2031), coating a first photographic material 17 on the waveguide layer 12, referring to FIG. 17, which illustrates the stereo view of the first substrate, the waveguide layer and the first photographic material of the 3-D waveguide coupling device capable of two-step coupling, as shown in FIG. 17, the first photographic material 17 is coated on the waveguide layer 12; Next to step (2032), placing the first mask 2 having at least one grating graph 21 over the first photographic material 17, referring to FIG. 18, which illustrates the stereo view of the first substrate, the waveguide layer, the first photographic material, and the first mask of the 3-D waveguide coupling device capable of two-step coupling, as shown in FIG. 18, an exposure is able to be executed after the first mask 2 is placed over the first photographic material 17; Then next to step (2033), transferring the grating graph 21 onto the first photographic material 17 by way of the exposure; Next to step (2034), forming the grating graph 21 on the first photographic material 17 through development; Finally, executing step (2035), manufacturing the assisting gratings 13 via etching, and as shown in FIG. 7, the assisting gratings 13 are formed on the waveguide layer 12 through the photolithography and the etching.

Figure 19:
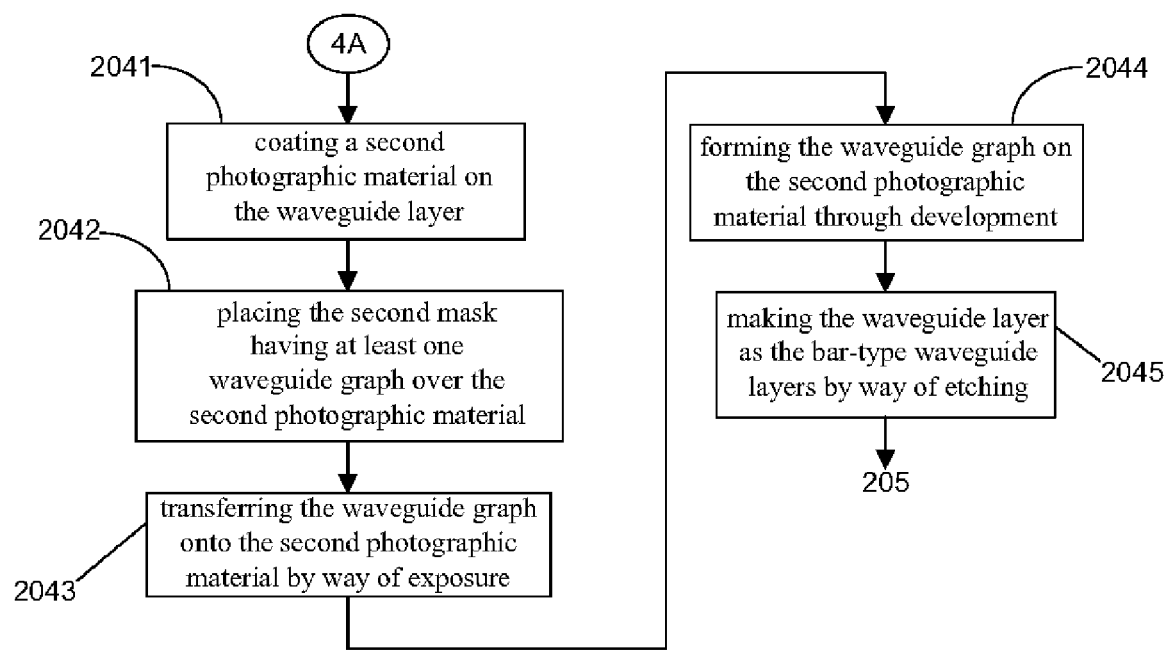
FIG. 19 is the flow chart of the detailed step of the step (204)
Figure 20:
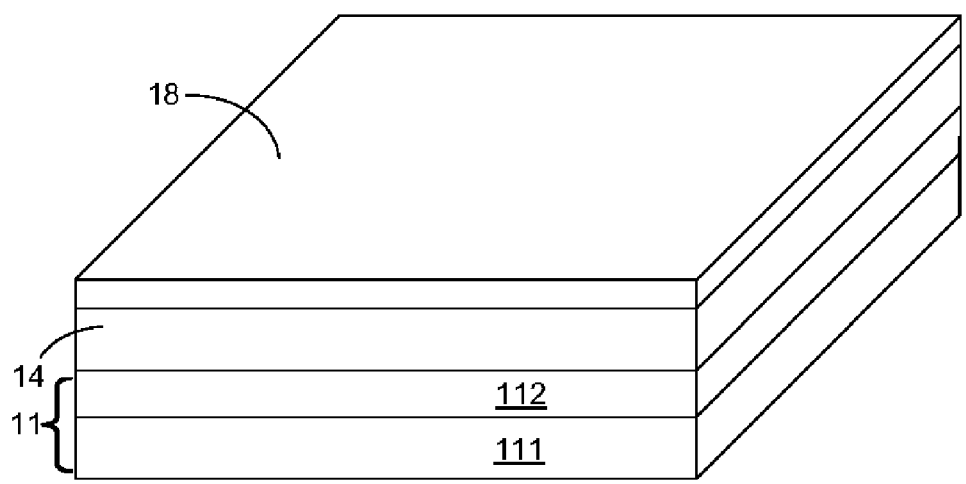
FIG. 20 is the stereo view of the first substrate, the waveguide layer and a second photographic material of the 3-D waveguide coupling device capable of two-step coupling.
Figure 21:
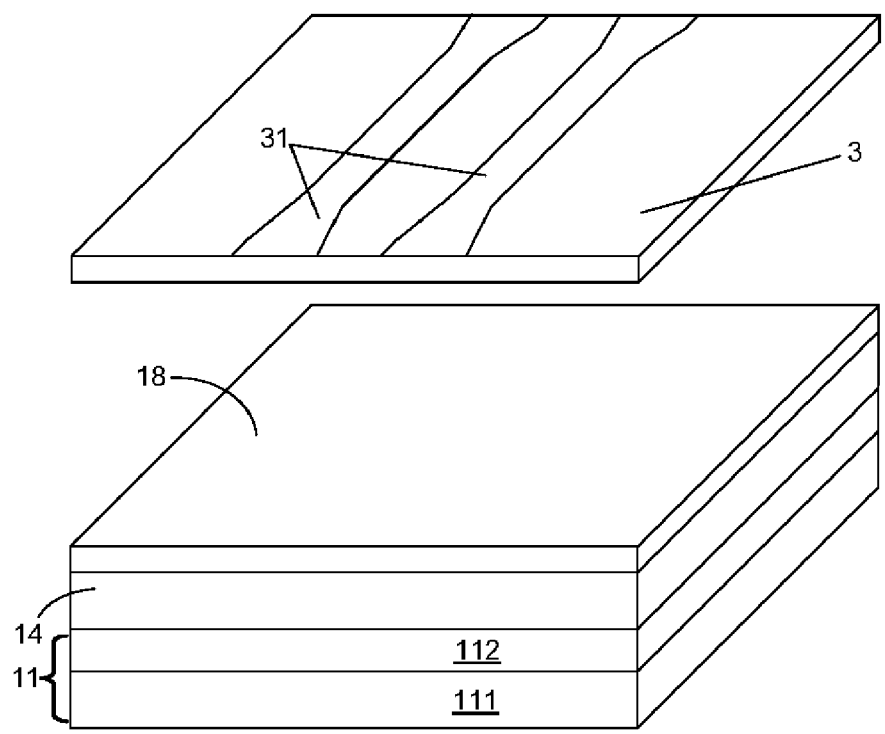
FIG. 21 is the stereo view of the first substrate, the waveguide layer, the second photographic material, and a second mask of the 3-D waveguide coupling device capable of two-step coupling.

Continuously referring to FIG. 19, which illustrates the detailed steps of the step (204), the abovementioned step (204) further includes the detailed steps of:

Firstly, executing step (2041), coating a second photographic material 18 on the waveguide layer 12, referring to FIG. 20, which illustrates the stereo view of the first substrate, the waveguide layer and the second photographic material of the 3-D waveguide coupling device capable of two-step coupling, as shown in FIG. 20, the second photographic material 18 is coated on the waveguide layer 12; Then next to step (2042), placing the second mask 3 having at least one waveguide graph 31 over the second photographic material 18, referring to FIG. 21, which illustrates the stereo view of the first substrate, the waveguide layer, the second photographic material, and the second mask of the 3-D waveguide coupling device capable of two-step coupling, as shown in FIG. 21, the exposure is able to be executed after the second mask 3 is placed over the second photographic material 18; Next to step (2043), transferring the waveguide graph 31 onto the second photographic material 18 by way of exposure; Then next to step (2044), forming the waveguide graph 31 on the second photographic material 18 through development; Finally, executing step (2045), making the waveguide layer 12 as the bar-type waveguide layers 121. As shown in FIG. 8, the waveguide layer 12 is made as two bar-type waveguide layers 121, there are two pairs of assisting gratings 13 over the two bar-type waveguide layers 121, respectively.

Figure 22:
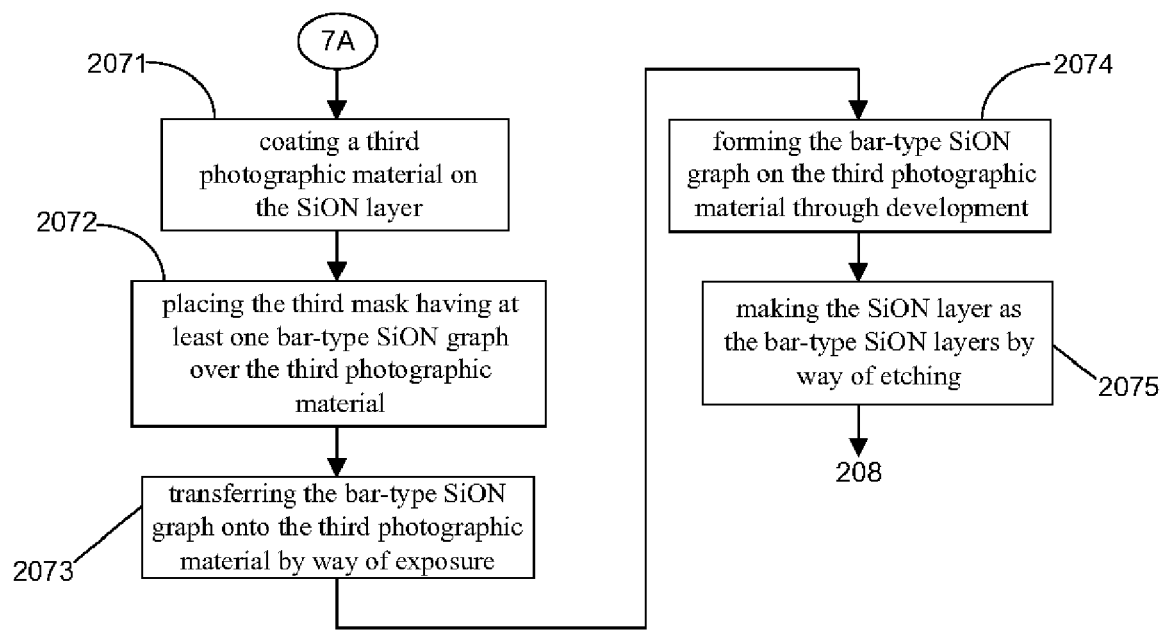
FIG. 22 is the flow chart of the detailed step of the step (207)
Figure 23:
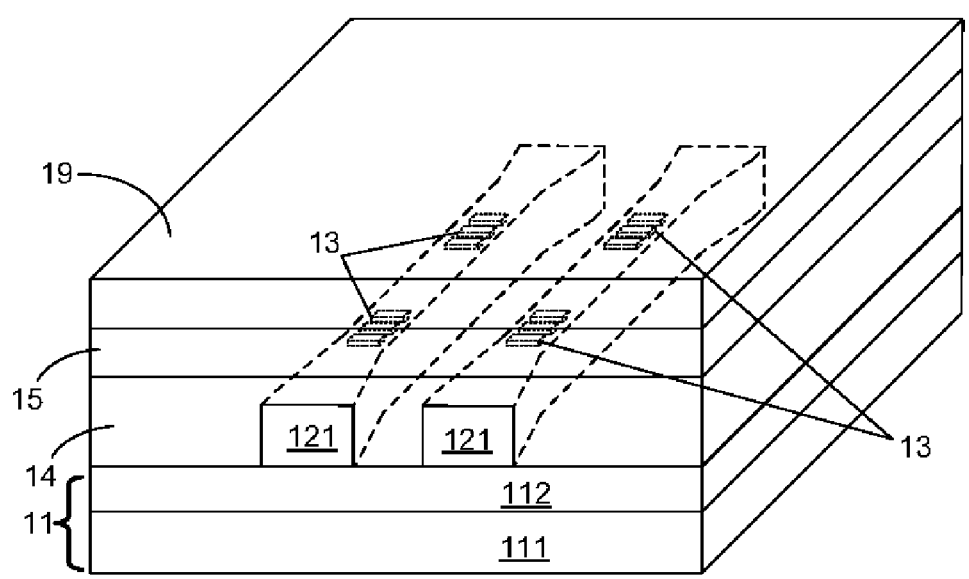
FIG. 23 is the stereo view of the first substrate, the waveguide layer, the SiON layer, and a third photographic material of the 3-D waveguide coupling device capable of two-step coupling.
Figure 24:
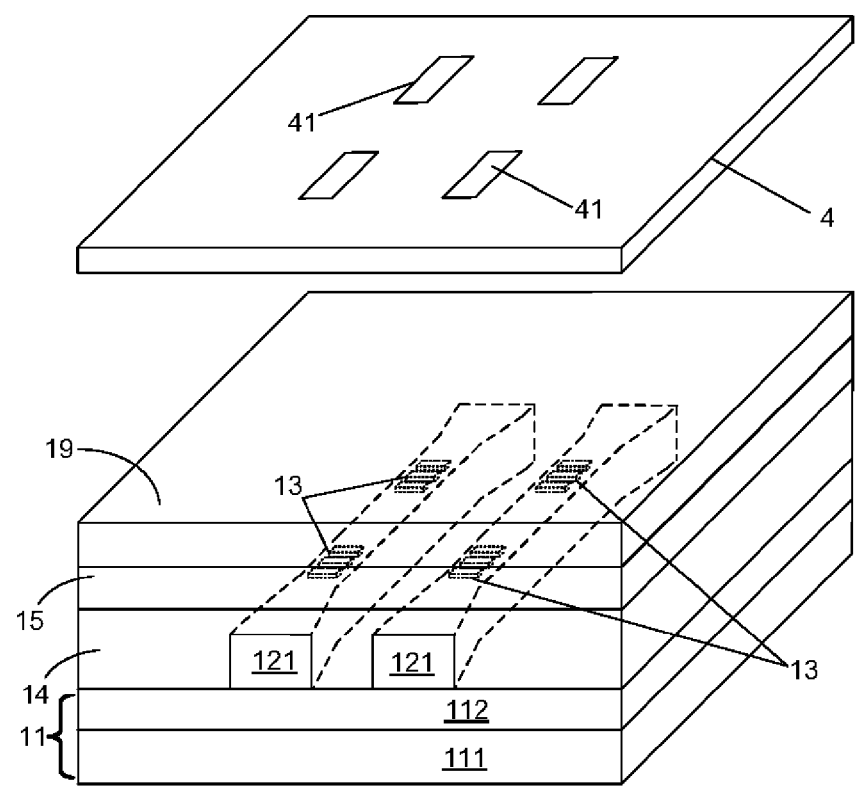
FIG. 24 is the stereo view of the first substrate, the waveguide layer, the SiON layer, the third photographic material, and a third mask of the 3-D waveguide coupling device capable of two-step coupling.

Continuously referring to FIG. 22, which illustrates the detailed steps of the step (207), the above mentioned step (207) further includes the detailed steps of:

Firstly, executing step (2071), coating a third photographic material 19 on the SiON layer 15, referring to FIG. 23, which illustrates the stereo view of the first substrate, the waveguide layer, the SiON layer, and the third photographic material of the 3-D waveguide coupling device capable of two-step coupling, as shown in FIG. 23, the third photographic material 19 is coated on the SiON layer 15; Next to step (2072), placing the third mask 4 having at least one bar-type SiON graph 41 over the third photographic material 19, referring to FIG. 24, which illustrates the stereo view of the first substrate, the waveguide layer, the SiON layer, the third photographic material, and the third mask of the 3-D waveguide coupling device capable of two-step coupling, as shown in FIG. 24, the exposure is able to be executed after the third mask 4 is placed over the third photographic material 19; Then next to step (2073), transferring the bar-type SiON graph 41 onto the third photographic material 19 by way of the exposure; Next to step (2074), forming the bar-type SiON graph 41 on the third photographic material 19 through development; Finally, executing step (2075), making the SiON layer 15 as the bar-type SiON layers 151 by way of etching. As shown in FIG. 11, the bar-type SiON layers 151 are formed on the SiO2 layer 14 by pair.

Figure 25:
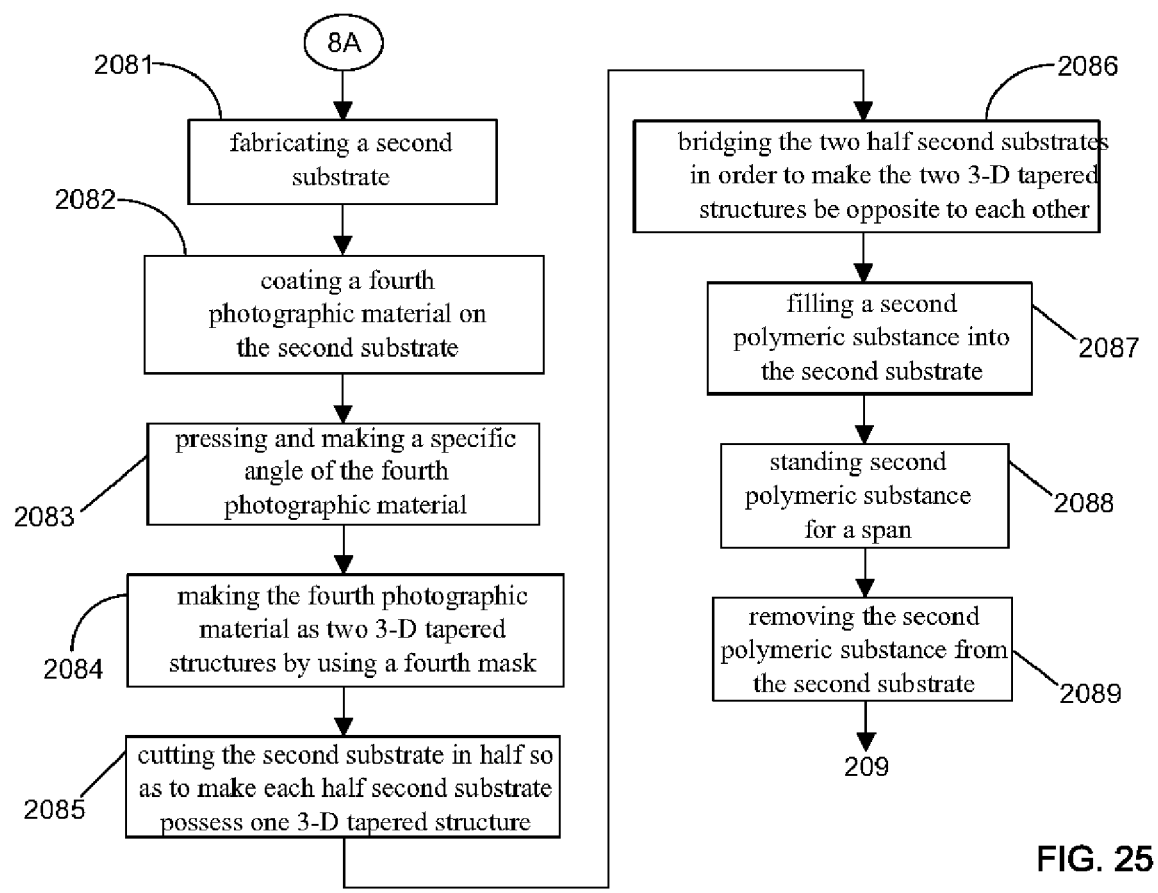
FIG. 25 is the flow chart of the detailed step of the step (208)
Figure 26:
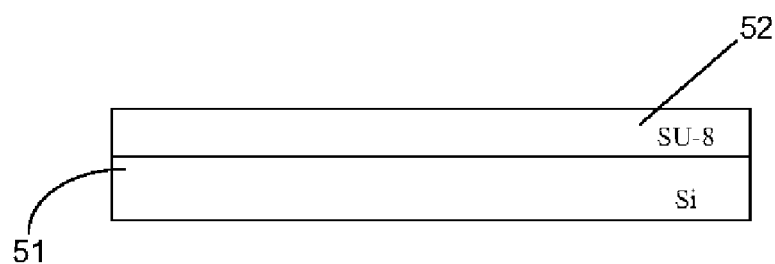
FIG. 26 is the cross-section view of a second substrate and a fourth photographic material of the mold for making the 3-D tapered structure layer.
Figure 27:
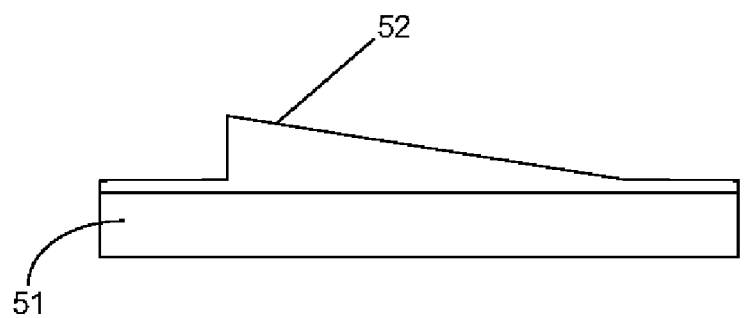
FIG. 27 is a second cross-section view of the second substrate and the fourth photographic material of the mold for making the 3-D tapered structure layer.
Figure 28:
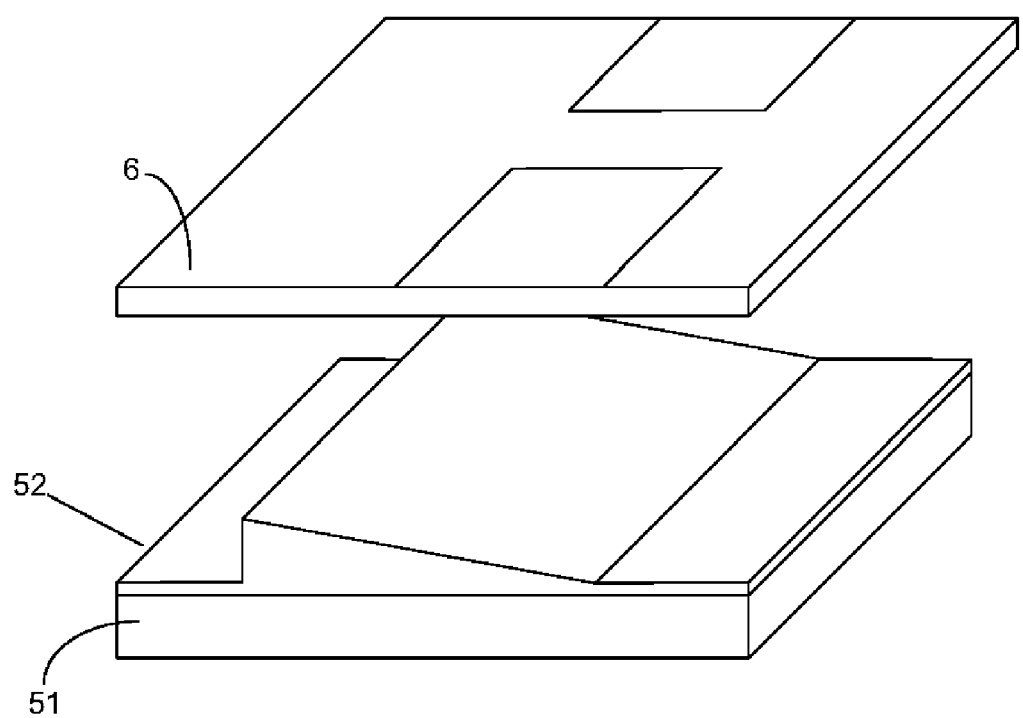
FIG. 28 is the stereo view of the second substrate, the fourth photographic material and a fourth mask of the mold for making the 3-D tapered structure layer.
Figure 29:
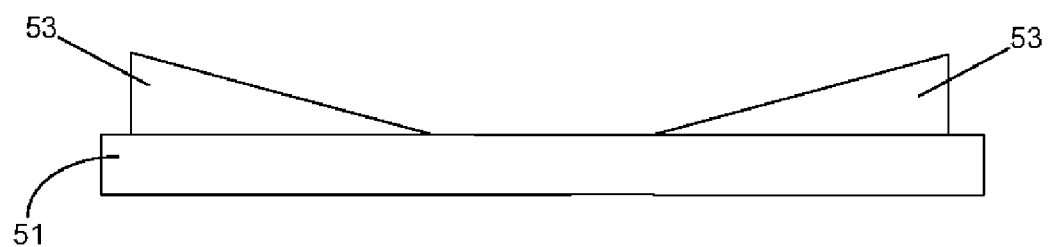
FIG. 29 is the cross-section view of the second substrate and two 3-D tapered structure of the mold end-to-end for making the 3-D tapered structure layer.
Figure 30:
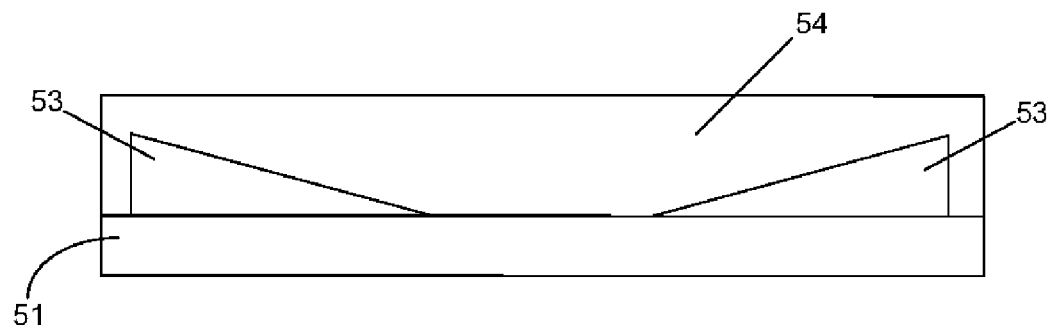
FIG. 30 is the cross-section view of the second substrate, the 3-D tapered structures and a second polymeric substance of the mold for making the 3-D tapered structure layer.
Figure 31:
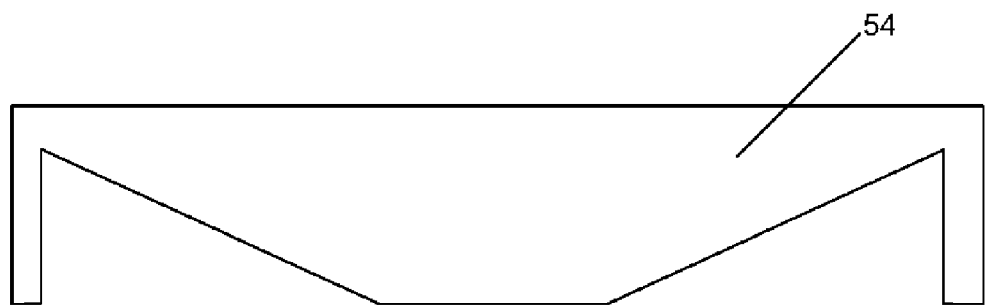
FIG. 31 is the cross-section view of the mold for making the 3-D tapered structure layer.

Please referring to FIG. 25, which illustrates the detailed steps of the step (208), the abovementioned step (208) further includes the detailed steps of:

Firstly, executing step (2081), fabricating a second substrate 51; Then next to step (2082), coating a fourth photographic material 52 on the second substrate 51, referring to FIG. 26, which illustrates the cross-section view of the second substrate and the fourth photographic material of the mold for making the 3-D tapered structure layer, as shown in FIG. 26, the fourth photographic material 52 is coated on the second substrate 51; Next to step (2083), pressing and making the fourth photographic material 52 has a specific angle, referring to FIG. 27, which illustrates a second cross-section view of the second substrate and the fourth photographic material of the mold for making the 3-D tapered structure layer, as shown in FIG. 27, the fourth photographic material 52 bear the specific angle after pressing; Then next to step (2084), making the fourth photographic material 52 as two 3-D tapered structures 53 by using a fourth mask 6 (the graph of the 3-D tapered structures 53 are plot in FIG. 29), referring to FIG. 28, which illustrates the stereo view of the second substrate, the fourth photographic material and the fourth mask of the mold for making the 3-D tapered structure layer, as shown in FIG. 28, the photolithography and the etching is able to be executed after the fourth mask 6 being disposed over the fourth photographic material 52;

Next to step (2085) after completing the step (2084), cutting the second substrate 51 in half so as to make each half second substrate 51 possess one 3-D tapered structure 53; continuously to execute step (2086), bridging the two half second substrates 51 in order to make the two 3-D tapered structures 53 be opposite to each other, referring to FIG. 29, which illustrates the cross-section view of the second substrate and two 3-D tapered structures of the mold for making the 3-D tapered structure layer, as shown in FIG. 29, the two 3-D tapered structures 53 are oppositely formed on the second substrate 51; Then next to step (2087), filling a second polymeric substance 54 into the second substrate 51, referring to FIG. 30, which illustrates the cross-section view of the second substrate, the 3-D tapered structures and the second polymeric substance of the mold for making the 3-D tapered structure layer, as shown in FIG. 30, the second polymeric substance 54 is filled into the second substrate 51 and solidifies as a fixed shape. Next to step (2088), standing second polymeric substance 54 for a span; Finally, executing step (2089), removing the second polymeric substance 54 from the second substrate 51, referring to FIG. 31, which illustrates the cross-section view of the mold for making the 3-D tapered structure layer, as shown in FIG. 31, the second polymeric substance 54 removed from the second substrate 51 been solidified as the mold 5 for making the 3-D tapered structure layer 16.

Figure 32:
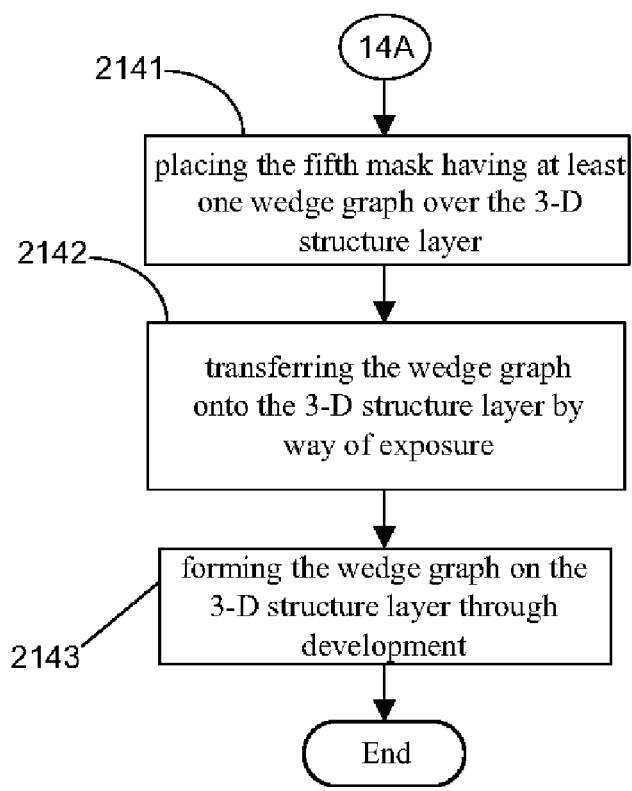
FIG. 32 is the flow chart of the detailed step of the step (214)
Figure 33:
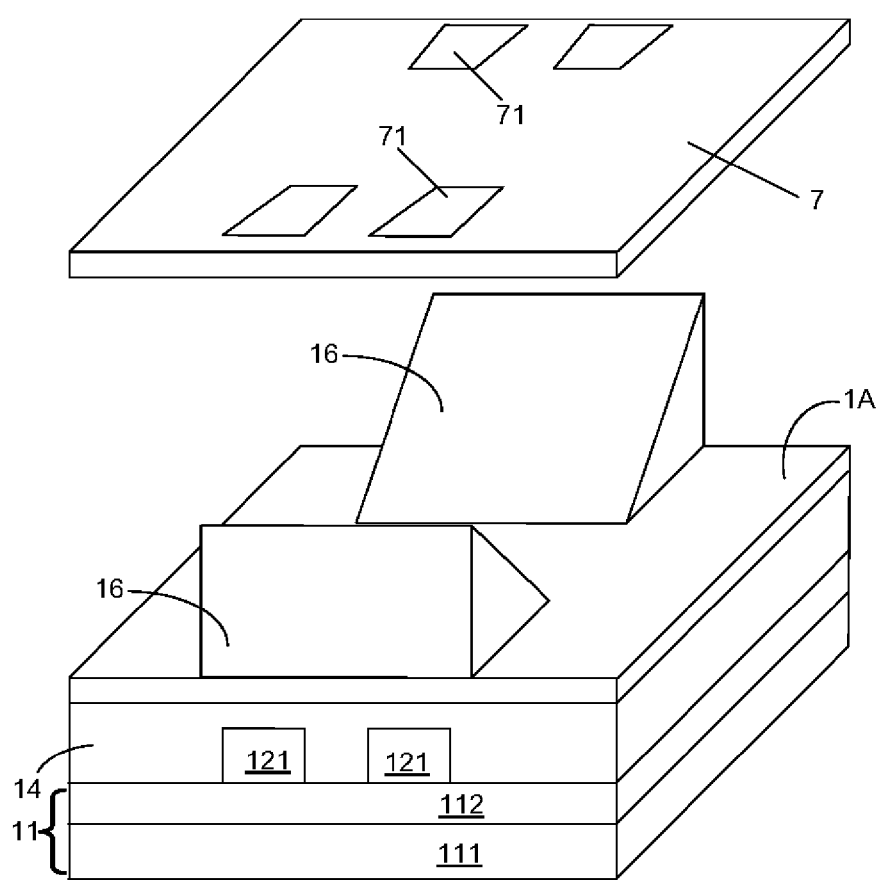
FIG. 33 is the stereo view of the first substrate, the waveguide layer, the assisting grating, the SiO2 layer, the SiON layer, the first polymeric substance, the 3-D tapered structure layer, and a fifth mask of the 3-D waveguide coupling device capable of two-step coupling.

Moreover, continuously referring to FIG. 32, which illustrates the detailed steps of the step (214), the abovementioned step (214) further includes the detailed steps of:

Firstly, executing step (2141), placing the fifth mask 7 having at least one wedge graph 71 over the 3-D tapered structure layer 16, referring to FIG. 33, which illustrates the stereo view of the first substrate, the waveguide layer, the assisting grating, the SiO2 layer, the SiON layer, the first polymeric substance, the 3-D tapered structure layer, and the fifth mask of the 3-D waveguide coupling device capable of two-step coupling, as shown in FIG. 33, the exposure is able to be continuously executed when the fifth mask 7 is placed over the 3-D tapered structure layer 16; Then next to step (2142), transferring the wedge graph 71 onto the 3-D tapered structure layer 16 by way of the exposure; Finally, executing the step (2143), forming the wedge graph 71 on the 3-D tapered structure layer 16 through development. As shown in FIG. 3, through the manufacture method, the 3-D waveguide coupling device capable of two-step coupling has been fabricated.

Thus, the 3-D waveguide coupling device capable of two-step coupling and the manufacture method thereof has been disclosed above completely and clearly via the cross-section views, the stereo views and the flow charts. In summary, the present invention has the following advantages:
1. Comparing to the grating-assist three dimension waveguide couple device of prior art, in the present invention, where the first coupling material layer and the second coupling material layer are added between the 3-D tapered structure layer and the waveguide layer, so that, the light can be coupled into the waveguide layer by way of two-step coupling.
2. Inheriting the advantage described in point 1, two-step coupling effectively increases the efficiency of the coupling of the light.
3. Through the manufacture method, the 3-D waveguide coupling device capable of two-step coupling is fabricated by using the present semiconductor processes without increasing any new equipment.

The above description is made on an embodiment of the present invention. However, this embodiment is not intended to limit scope of the present invention, and all equivalent implementations or alterations within the spirit of the present invention still fall within the scope of the present invention.

We claim:
1. A 3-D waveguide coupling device comprising:
a substrate;
at least one waveguide layer, being formed on the substrate to be a propagation layer of a light;
at least one assisting grating, being formed on the waveguide layer and capable of helping to lead the light into the waveguide layer;
two coupling material layers, consisting of a first coupling material layer and a second coupling material layer, wherein the first coupling material layer is a silicon oxide layer and formed on the waveguide layer by way of covering the assisting grating, and the second coupling material layer is a silicon nitride layer, formed on the first coupling material layer; and
at least one 3-D tapered structure layer, being made of photosensitive material and formed on the second coupling material layer, and having a height differential between two terminal ends thereof, wherein one terminal end of the 3-D tapered structure layer is used for connecting an external optical fiber, and the 3-D tapered structure layer would show a two-dimension transverse variation when the light is inputted in to the 3-D tapered structure layer from the external optical fiber via the connected terminal end of the 3-D tapered structure layer;
wherein the refractive index of the waveguide layer is greater than the reflective index of the first coupling material layer, the refractive index of the first coupling material layer is greater than the refractive index of the second coupling material layer, and the refractive index of the second coupling material layer is greater than the refractive index of the 3-D tapered structure layer;
wherein the two-dimension transverse variation makes the propagation constant of the 3-D tapered structure layer be coincident with the propagation constant of the coupling material layer, and then the inputted light can be coupled into the second coupling material layer from the 3-D tapered structure layer directly and efficiently; therefore, the light would be next coupled into the first coupling material layer and eventually coupled into the waveguide layer from the second coupling material layer losslessly.

2. The 3-D waveguide coupling device of claim 1, wherein the substrate is selected from the group consisting of: a silicon-on-insulator substrate, a silicon oxinitride (SiON)-on-insulatior substrate, a silicon nitride (SiN)-on-insulator substrate, and a semiconductor substrate.

3. The 3-D waveguide coupling device of claim 1, wherein the waveguide layer is selected from the group consisting of: a silicon (Si), a silicon nitride (SiN), a silicon oxinitride (SiON), and a silicon carbide (SiC).

* * * * *